US011833761B1

(12) United States Patent
Douglas et al.

(10) Patent No.: US 11,833,761 B1
(45) Date of Patent: *Dec. 5, 2023

(54) OPTIMIZING INTERACTION WITH OF TANGIBLE TOOLS WITH TANGIBLE OBJECTS VIA REGISTRATION OF VIRTUAL OBJECTS TO TANGIBLE TOOLS

(71) Applicants: Robert Edwin Douglas, Winter Park, FL (US); Kathleen Mary Douglas, Winter Park, FL (US); David Byron Douglas, Winter Park, FL (US)

(72) Inventors: Robert Edwin Douglas, Winter Park, FL (US); Kathleen Mary Douglas, Winter Park, FL (US); David Byron Douglas, Winter Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/402,609

(22) Filed: Aug. 15, 2021

Related U.S. Application Data

(63) Continuation of application No. 17/075,799, filed on Oct. 21, 2020, now Pat. No. 11,090,873, which is a continuation-in-part of application No. 16/779,658, filed on Feb. 2, 2020, now Pat. No. 10,846,911.

(51) Int. Cl.
| | |
|---|---|
| *H04N 11/02* | (2006.01) |
| *B29C 64/393* | (2017.01) |
| *H04N 13/344* | (2018.01) |
| *G06T 19/00* | (2011.01) |
| *G06T 19/20* | (2011.01) |

(52) U.S. Cl.
CPC .......... *B29C 64/393* (2017.08); *G06T 19/006* (2013.01); *G06T 19/20* (2013.01); *H04N 13/344* (2018.05); *G06T 2219/004* (2013.01)

(58) Field of Classification Search
CPC .................................................. H04N 13/344
USPC ............................................................ 700/98
See application file for complete search history.

(56) References Cited

U.S. PATENT DOCUMENTS

| | | | | | |
|---|---|---|---|---|---|
| 5,271,401 | A | * | 12/1993 | Fishman | A61B 6/481 424/9.4 |
| 5,412,703 | A | * | 5/1995 | Goodenough | G01N 23/046 378/4 |
| 5,535,747 | A | * | 7/1996 | Katakura | A61B 8/04 600/438 |
| 6,847,336 | B1 | * | 1/2005 | Lemelson | H04N 7/147 345/8 |
| 8,384,771 | B1 | * | 2/2013 | Douglas | H04N 13/344 348/42 |
| 9,349,183 | B1 | * | 5/2016 | Douglas | G02B 27/017 |
| 9,383,895 | B1 | * | 7/2016 | Vinayak | G06F 3/04883 |
| 10,078,377 | B2 | * | 9/2018 | Balan | G06T 19/006 |
| 10,254,546 | B2 | * | 4/2019 | Poulos | G02B 27/017 |
| 10,515,484 | B1 | * | 12/2019 | Lucas | G06F 3/011 |

(Continued)

*Primary Examiner* — Leron Beck

(57) ABSTRACT

In this patent, a method for improving interaction with tangible objects is disclosed. A user wearing an augmented reality head display unit sees tangible objects. A database comprising appropriate orientation and position of a first tangible object with a second tangible object is established. A virtual object to correspond to a second tangible object is generated and registered to the first tangible object with proper positioning and orientation according to the database. The user, by watching the virtual object, can far more easily align the first tangible object with the second tangible object. Thus, this patent can help in construction-type activities.

20 Claims, 13 Drawing Sheets

(56) References Cited

U.S. PATENT DOCUMENTS

| | | | | |
|---|---|---|---|---|
| 2002/0048343 A1* | 4/2002 | Launay | ............... | G06T 17/00 |
| | | | | 378/98.12 |
| 2003/0048357 A1* | 3/2003 | Kain | ............... | B64D 47/08 |
| | | | | 348/117 |
| 2003/0225513 A1* | 12/2003 | Gagvani | ............... | G06T 15/04 |
| | | | | 340/995.14 |
| 2005/0017972 A1* | 1/2005 | Poole | ............... | A61B 8/461 |
| | | | | 345/424 |
| 2005/0168461 A1* | 8/2005 | Acosta | ............... | G06T 19/00 |
| | | | | 345/419 |
| 2006/0178580 A1* | 8/2006 | Nakamura | ............... | G06V 40/1347 |
| | | | | 600/438 |
| 2006/0181482 A1* | 8/2006 | Iaquinto | ............... | A61B 90/36 |
| | | | | 345/8 |
| 2006/0197837 A1* | 9/2006 | Flath | ............... | G06T 5/006 |
| | | | | 348/143 |
| 2006/0241458 A1* | 10/2006 | Hayashi | ............... | A61B 8/06 |
| | | | | 600/453 |
| 2007/0024612 A1* | 2/2007 | Balfour | ............... | G06F 16/954 |
| | | | | 345/419 |
| 2007/0263915 A1* | 11/2007 | Mashiach | ............... | G06V 10/457 |
| | | | | 382/130 |
| 2008/0240616 A1* | 10/2008 | Haering | ............... | G06T 7/80 |
| | | | | 382/294 |
| 2009/0321636 A1* | 12/2009 | Ragucci | ............... | H04N 23/90 |
| | | | | 382/173 |
| 2010/0053151 A1* | 3/2010 | Marti | ............... | H04N 13/279 |
| | | | | 340/407.1 |
| 2010/0081912 A1* | 4/2010 | McKenna | ............... | A61B 5/1455 |
| | | | | 600/368 |
| 2011/0196237 A1* | 8/2011 | Pelissier | ............... | A61B 8/543 |
| | | | | 600/454 |
| 2011/0257561 A1* | 10/2011 | Gertner | ............... | A61N 7/00 |
| | | | | 600/407 |
| 2011/0316854 A1* | 12/2011 | Vandrovec | ............... | G06T 17/205 |
| | | | | 345/420 |
| 2012/0215096 A1* | 8/2012 | Gilboa | ............... | G09B 23/28 |
| | | | | 600/426 |
| 2013/0095924 A1* | 4/2013 | Geisner | ............... | A63F 13/21 |
| | | | | 463/32 |
| 2013/0188848 A1* | 7/2013 | Helm | ............... | G16H 50/50 |
| | | | | 382/131 |
| 2013/0230224 A1* | 9/2013 | Claude | ............... | G06T 7/12 |
| | | | | 382/173 |
| 2014/0204002 A1* | 7/2014 | Bennet | ............... | G06T 19/006 |
| | | | | 345/7 |
| 2014/0307067 A1* | 10/2014 | Douglas | ............... | H04N 13/344 |
| | | | | 348/53 |
| 2015/0379351 A1* | 12/2015 | Dibenedetto | ............... | G02B 27/017 |
| | | | | 345/633 |
| 2016/0140930 A1* | 5/2016 | Pusch | ............... | G06F 3/011 |
| | | | | 345/633 |
| 2016/0217612 A1* | 7/2016 | Petill | ............... | G06T 7/70 |
| 2017/0140552 A1* | 5/2017 | Woo | ............... | G06F 3/0304 |
| 2017/0185141 A1* | 6/2017 | Shotton | ............... | G06F 3/04815 |
| 2017/0367766 A1* | 12/2017 | Mahfouz | ............... | A61B 17/155 |
| 2018/0047304 A1* | 2/2018 | Sankaran | ............... | G09B 23/303 |
| 2018/0116728 A1* | 5/2018 | Lang | ............... | A61B 17/1703 |
| 2018/0168730 A1* | 6/2018 | Nazy | ............... | G16H 30/40 |
| 2018/0168740 A1* | 6/2018 | Ryan | ............... | A61B 90/36 |
| 2018/0315247 A1* | 11/2018 | Van Andel | ............... | G06F 3/017 |
| 2019/0019508 A1* | 1/2019 | Rochford | ............... | G06F 3/013 |
| 2019/0057555 A1* | 2/2019 | Gallop | ............... | G06T 19/20 |
| 2019/0088004 A1* | 3/2019 | Lucas | ............... | G06T 19/20 |
| 2019/0094955 A1* | 3/2019 | Zuber | ............... | G06F 3/016 |
| 2019/0378280 A1* | 12/2019 | Cho | ............... | G06T 11/00 |
| 2020/0333940 A1* | 10/2020 | Lee | ............... | G06F 3/016 |

* cited by examiner

Example database

GENERATION OF 3D VIRTUAL OBJECTS TO MATCH A TANGIBLE OBJECT
Fig. 3A Displaying a 3D virtual object that matches a tangible object
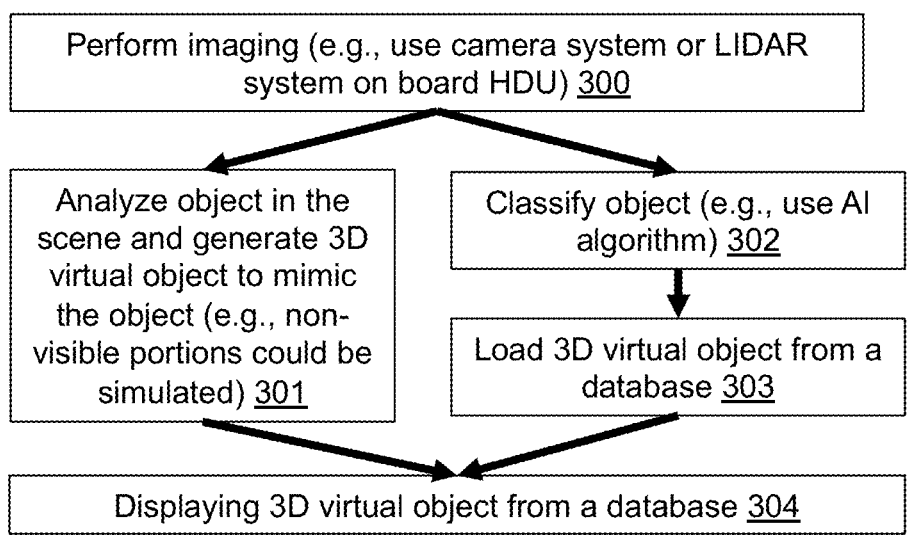
Fig. 3B Tangible object
Fig. 3C 3D virtual object that matches the tangible object
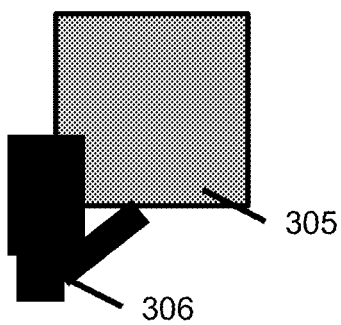
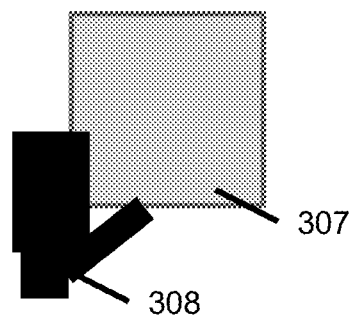

DYNAMIC ALTERATIONS OF 3D VIRTUAL OBJECT
(OVER MULTIPLE TIME POINTS)
Fig. 4A 3D virtual object
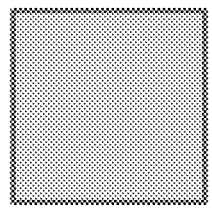
Fig. 4B 3D virtual object
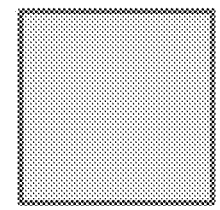
Fig. 4C 3D virtual object
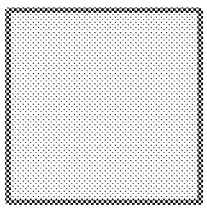
Fig. 4D 3D virtual object
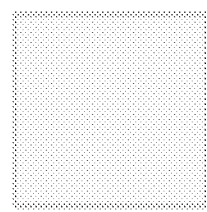
Fig. 4E 3D virtual object
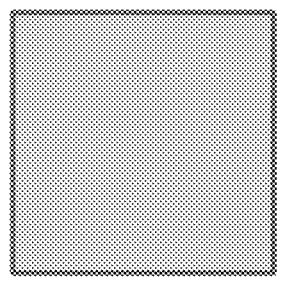

GENERATION OF 3D VIRTUAL OBJECT(S) TO COMPLEMENT A TANGIBLE OBJECT
Fig. 5A Generating a complementary 3D virtual object
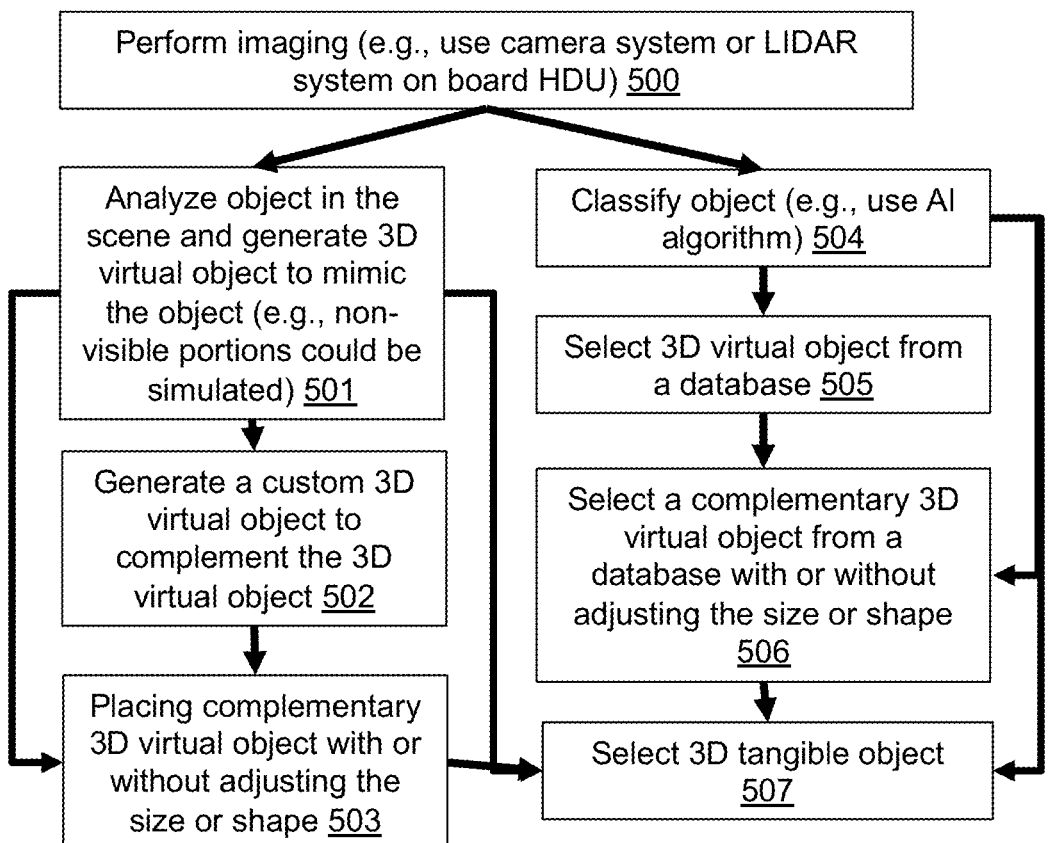
Fig. 5B Tangible object
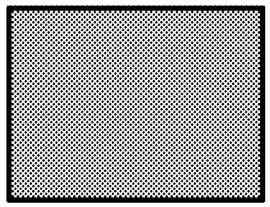
Fig. 5E Registration
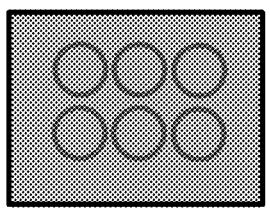
Fig. 5C Virtual object
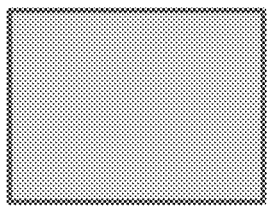
Fig. 5F Resizing of virtual objects
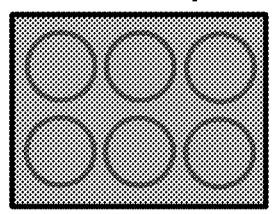
Fig. 5D Selected complementary virtual object(s)
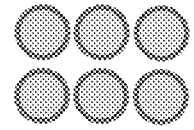
Fig. 5G Selection of complementary tangible objects
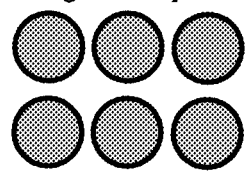

PREDETERMINED SPATIAL RELATIONSHIPS

Fig. 7A First tangible object and second tangible object
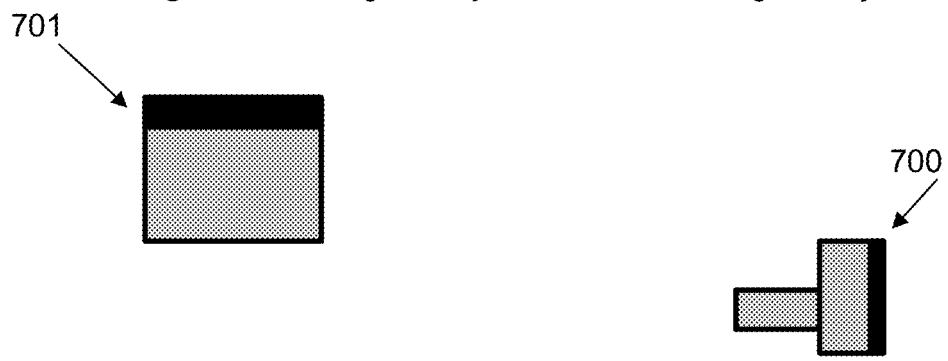
Fig. 7B View of first tangible object and second tangible object in HDU
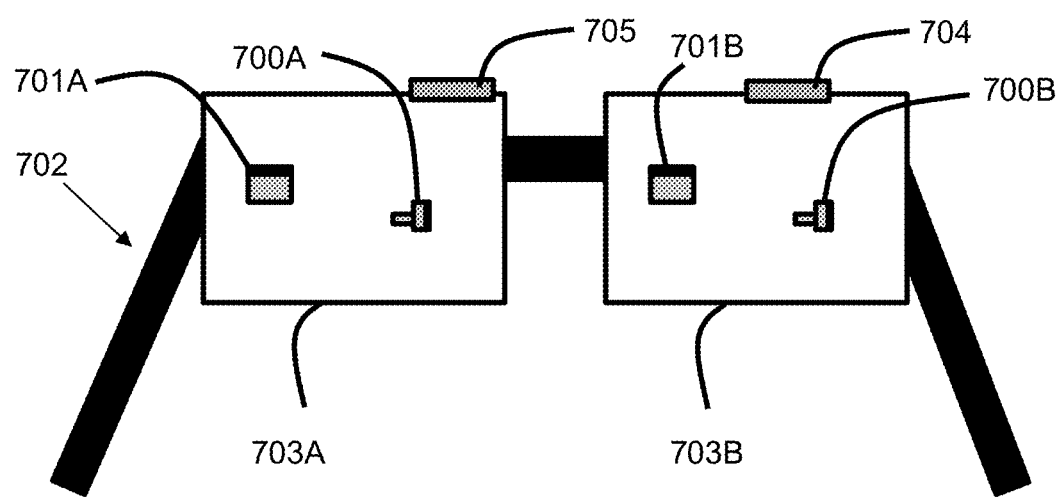

REGISTRATION
Fig. 8A First tangible object and second tangible object
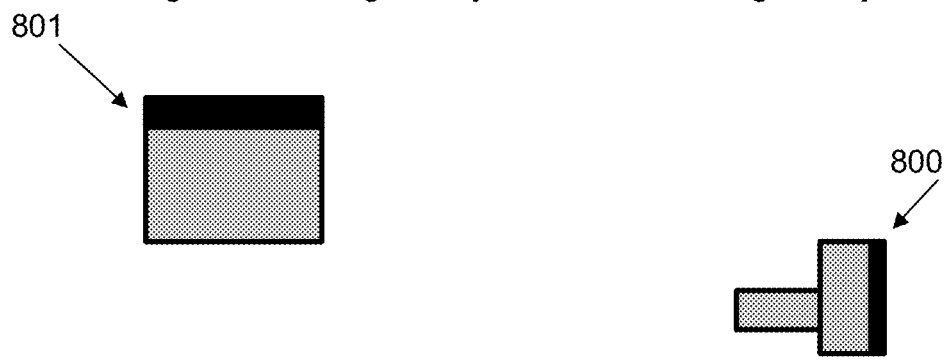
Fig. 8B View of first tangible object, second tangible object and a registered 3D virtual object
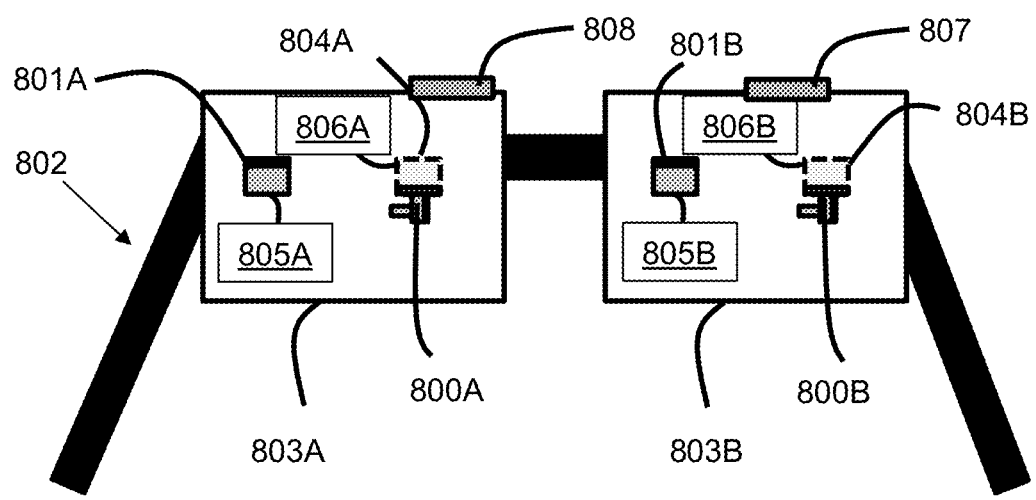

CHANGING POSITION
Fig. 9A First tangible object and second tangible object
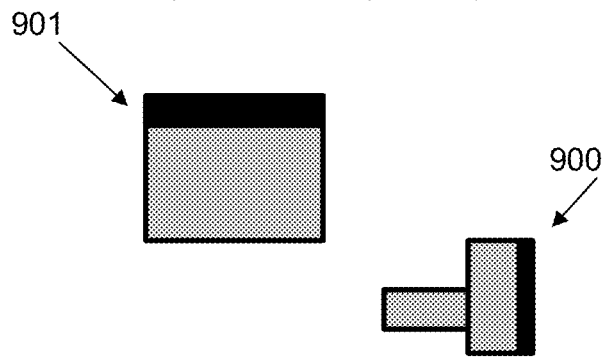
Fig. 9B View of first tangible object, second tangible object and registered 3D virtual object
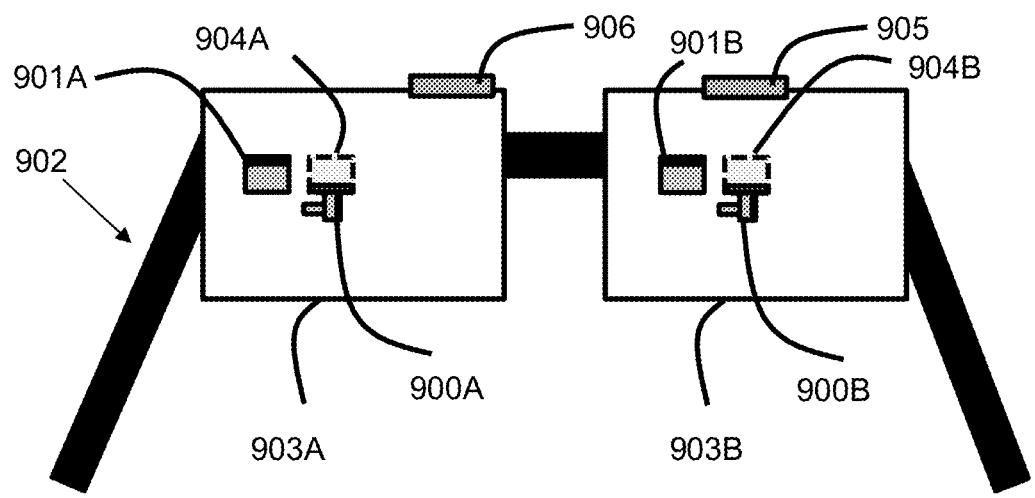

CHANGING ORIENTATION
Fig. 10A First tangible object and second tangible object
Fig. 10B View of first tangible object, second tangible object and a registered 3D virtual object
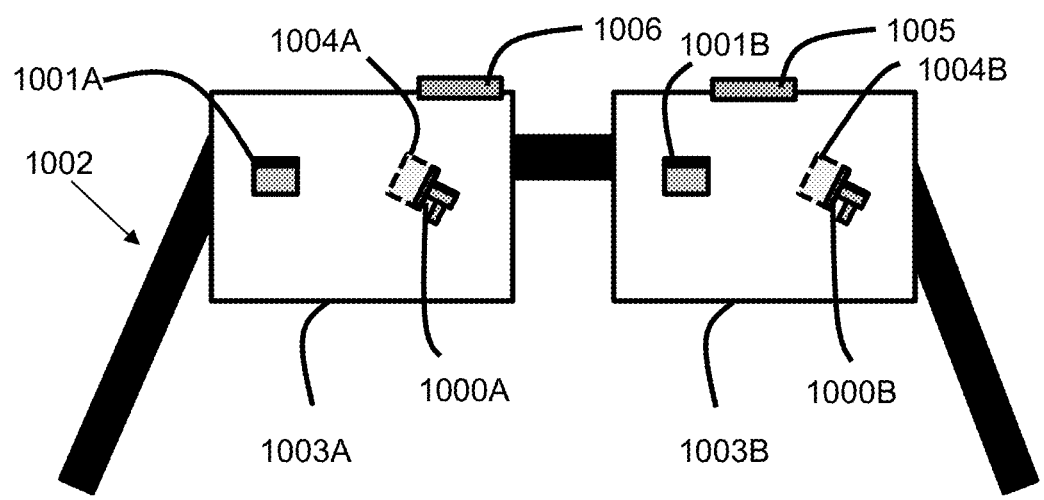

TEACHING COMING TOGETHER
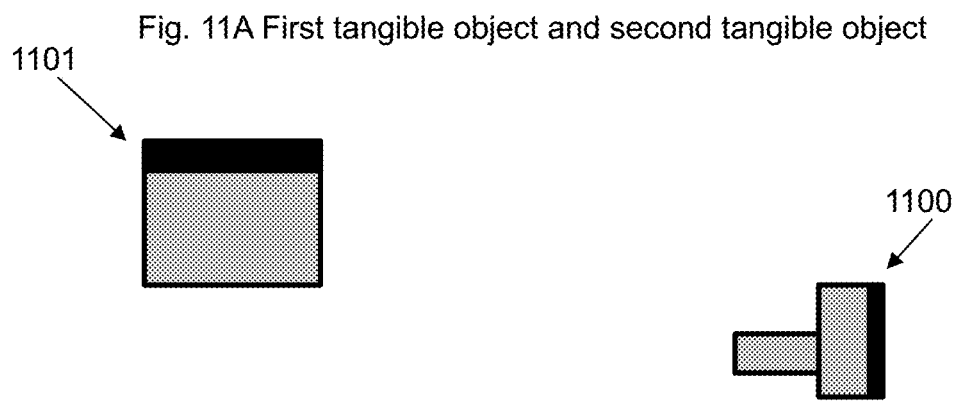
Fig. 11A First tangible object and second tangible object
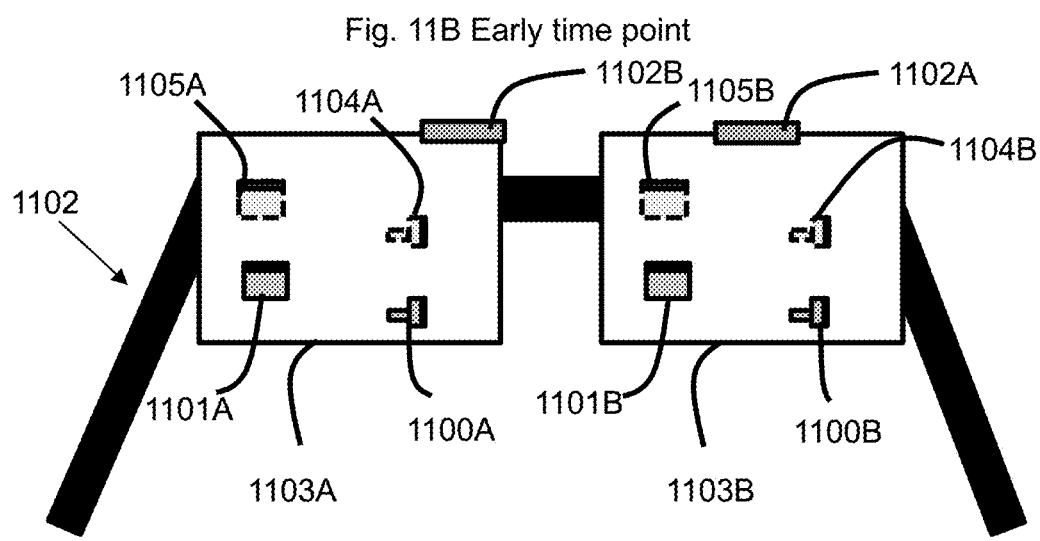
Fig. 11B Early time point
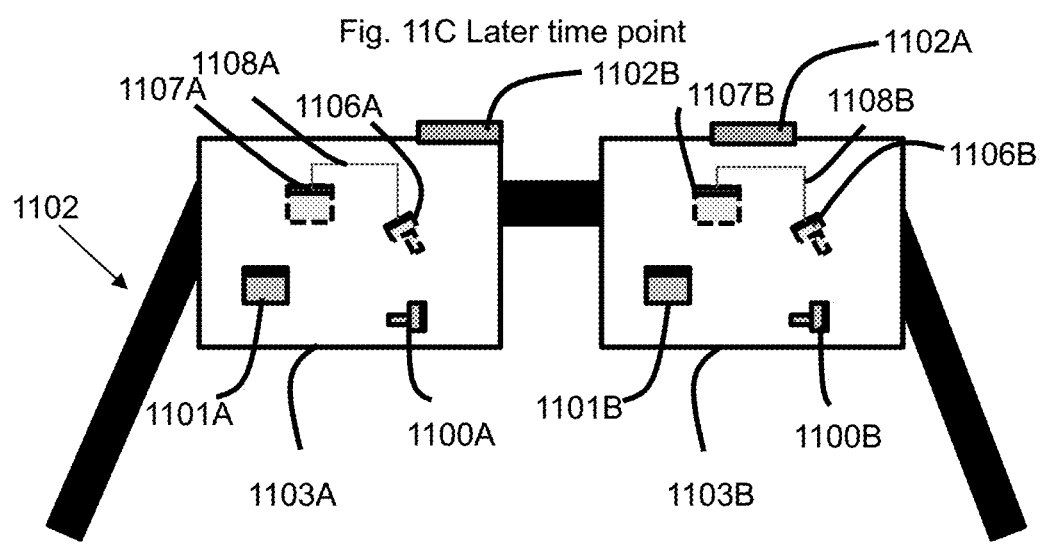
Fig. 11C Later time point

VIRTUAL LINE CONCEPT

Options for display of virtual objects

Movements of the virtual 3D object(s):
- Rate: Fast or slow
- Directional path: right angles or smooth arcs
- Control:
    - Computer controlled (e.g., via AI algorithm to learn what works best for an individual user)
    - User controlled (e.g., via hand gesture)
    - Combination

Positioning options (with respect to the tangible object which the virtual 3D object mimics):
- Above or below
- In front or in back
- To the left or to the right
- Superimposed
- Note positioning options may change over time.

Sizing options (with respect to the tangible object which the virtual 3D object mimics):
- Same size
- Larger
- Smaller
- Note sizing options may change over time.

Virtual line options
- Variable color (e.g., red, blue, green)
- Variable thickness (e.g., rope-like thickness, dental-floss like thickness)
- Variable brightness (e.g., bright, dark, etc.)
- Variable course through 3D space (e.g., right angles or smooth arcs)
- Note virtual line options may change over time.

Figure 13

OPTIMIZING INTERACTION WITH OF TANGIBLE TOOLS WITH TANGIBLE OBJECTS VIA REGISTRATION OF VIRTUAL OBJECTS TO TANGIBLE TOOLS

CROSS REFERENCE TO RELATED APPLICATIONS

This application is a continuation in part of U.S. patent application Ser. No. 17/075,799 filed on Oct. 21, 2020, which is a continuation in part of U.S. patent application Ser. No. 16/779,658 filed on Feb. 2, 2020 (issued as U.S. Pat. No. 10,846,911 on Nov. 24, 2020).

TECHNICAL FIELD

Aspects of this disclosure are generally related to use of distribution of work.

INTRODUCTION

Augmented reality or mixed reality head display units have the potential to improve manufacturing.

SUMMARY

All examples, aspects and features mentioned in this document can be combined in any technically conceivable way.

This patent teaches a method, software and apparatus for improving interaction between virtual tools and geo-registered tools. A non-transitory computer storage medium having computer-executable instructions stored thereon which, when executed by a processor, cause the processor to perform the operations disclosed in this patent. A head display unit (HDU) is also disclosed herein wherein the HDU comprises a communications interface, wherein the communications interface is in communication with a non-transitory memory and a processor, the non-transitory memory having computer-executable instructions, which when executed by the processor, perform the operations disclosed in this patent.

In this patent, a method for improving interaction with tangible objects is disclosed. A user wearing an augmented reality head display unit sees tangible objects. A database comprising appropriate orientation and position of a first tangible object with a second tangible object is established. A virtual object to correspond to a second tangible object is generated and registered to the first tangible object with proper positioning and orientation according to the database. The user, by watching the virtual object, can far more easily align the first tangible object with the second tangible object. Thus, this patent can help in construction-type activities.

The preferred application of this technology is in the construction field for an unfamiliar operator. An example includes a person at home building a desk from a box of parts. Rather than struggling with an instruction manual, this process generated an interaction of virtual objects with tangible tools and makes the building of a desk at home easier. In the preferred embodiment, a user wears a head display unit (HDU) and views both virtual objects and tangible objects. The user would download an app, spread out the parts and proceed with building of the desk.

The preferred embodiment comprises: performing imaging to classify a first tangible object (e.g., a tangible tool) and a second tangible object; using a pre-determined spatial relationship between said first tangible object and said second tangible object; generating a 3D virtual object wherein said 3D virtual object is a representation of at least a portion of said second tangible object; registering said virtual 3D object to said first tangible object with said pre-determined spatial relationship; generating a left eye image of said virtual 3D object for a left eye of a user based on a left eye viewpoint, a viewing angle and said virtual 3D object; generating a right eye image of said virtual 3D object for a right eye of said user based on a right eye viewpoint, said viewing angle and said virtual 3D object; displaying in an augmented reality head display unit (HDU) said left eye image on a left eye display of said augmented reality HDU wherein said user looking through said left eye display with said left eye sees: a left eye view of said first tangible object; and said left eye image of said virtual 3D object; and displaying in said augmented reality HDU said right eye image on a right eye display wherein said user looking through said right eye display with said right eye sees: a right eye view of said first tangible object; and said right eye image of said virtual 3D object.

Some embodiments comprise wherein the pre-determined spatial relationship comprises a fixed orientation of said virtual 3D object to said first tangible object. Some embodiments comprise wherein the pre-determined spatial relationship comprises a fixed position of said virtual 3D object to said first tangible object. Some embodiments comprise wherein the pre-determined spatial relationship is stored in a database. Some embodiments comprise wherein the first tangible object is held in said user's hand. Some embodiments comprise performing an alteration of a color of said virtual 3D object. Some embodiments comprise performing an alteration of a grayscale of said virtual 3D object. Some embodiments comprise performing an alteration of a transparency of said virtual 3D object. Some embodiments comprise performing an alteration of a size of said virtual 3D object. Some embodiments comprise performing an alteration of a dynamic alteration of an appearance of virtual 3D object. Some embodiments comprise performing wherein the augmented reality HDU displays annotations for said virtual 3D object. Some embodiments comprise wherein the augmented reality HDU displays annotations for said first tangible 3D printed object. Some embodiments comprise wherein the first tangible object and said virtual 3D object comprise at least one of the group consisting of: manufacturing objects; medical objects; education objects; and agricultural objects. Some embodiments comprise wherein said first tangible object and said second tangible object are imaged by at least one of the group of a camera system and a LIDAR system. Some embodiments comprise wherein said first tangible object and said second tangible object are classified by an artificial intelligence algorithm. Some embodiments comprise generating a digital object at a location on said second tangible object; and displaying visual notification on said HDU. Some embodiments comprise generating a digital object to denote an orientation of said second tangible object; and displaying visual notification on said HDU. Some embodiments comprise generating a second 3D virtual object wherein said second 3D virtual object is a representation of at least a portion of said first tangible object; and displaying said second 3D virtual object on said HDU. Some embodiments comprise performing deformation of images per U.S. Pat. No. 10,878,639, INTERACTIVE VOXEL MANIPULATION IN VOLUMETRIC MEDICAL IMAGING FOR VIRTUAL MOTION, DEFORMABLE TISSUE, AND VIRTUAL RADIOLOGICAL DISSECTION, which is incorporated by reference in its entirety.

BRIEF DESCRIPTION OF THE FIGURES

FIG. 1 illustrates optimizing interaction with of tangible tools with tangible objects via registration of virtual objects to tangible tools.

FIG. 3A illustrates a flow diagram for generating a 3D virtual object.

FIG. 3B illustrates a tangible object.

FIG. 3C illustrates a 3D virtual object, which matches the tangible object.

FIG. 4A illustrates the 3D virtual object.

FIG. 4B illustrates the 3D virtual object, which has been changed in color to an orange color. Various colors can be used.

FIG. 4C illustrates the 3D virtual object, which has been changed in grayscale to a light gray. Various gray scales can be used.

FIG. 4D illustrates the 3D virtual object, which has been changed in transparency to a highly transparent. Various transparencies can be used.

FIG. 4E illustrates the 3D virtual object, which has been changed in size to larger.

Various size changes can be performed.

FIG. 5A illustrates generating a 3D virtual object to complement a tangible object.

FIG. 5B illustrates a tangible object, which in this case is the tangible engine block without cylinders/pistons.

FIG. 5C illustrates a virtual object, which in this case is a 3D virtual object representing an engine block without cylinders/pistons.

FIG. 5D illustrates the selected (or generated) complementary virtual object(s), which in this case are 3D virtual objects representing six cylinders/pistons.

FIG. 5E illustrates placing the 3D virtual objects representing six cylinders/pistons into either the tangible engine block or the 3D virtual object representing an engine block without cylinders/pistons.

FIG. 5F illustrates resizing of the 3D virtual objects representing six cylinders/pistons so that they are more appropriately sized with respect to either the tangible engine block or the 3D virtual object representing an engine block without cylinders/pistons.

FIG. 5G illustrates selection or generation of complementary tangible objects.

Figure 6A:
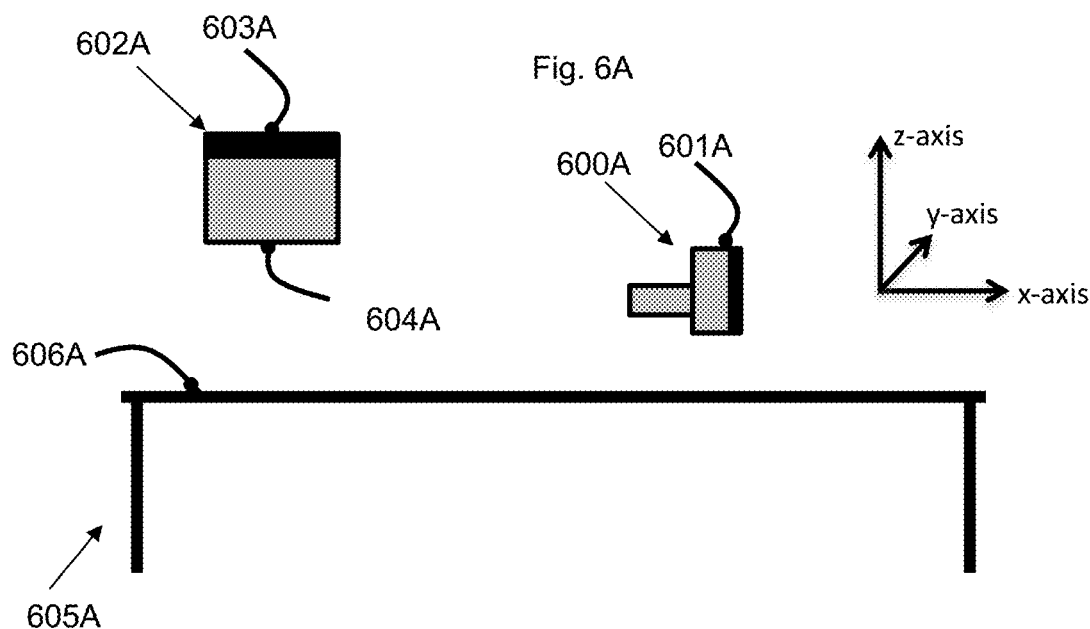
Figure 6B:
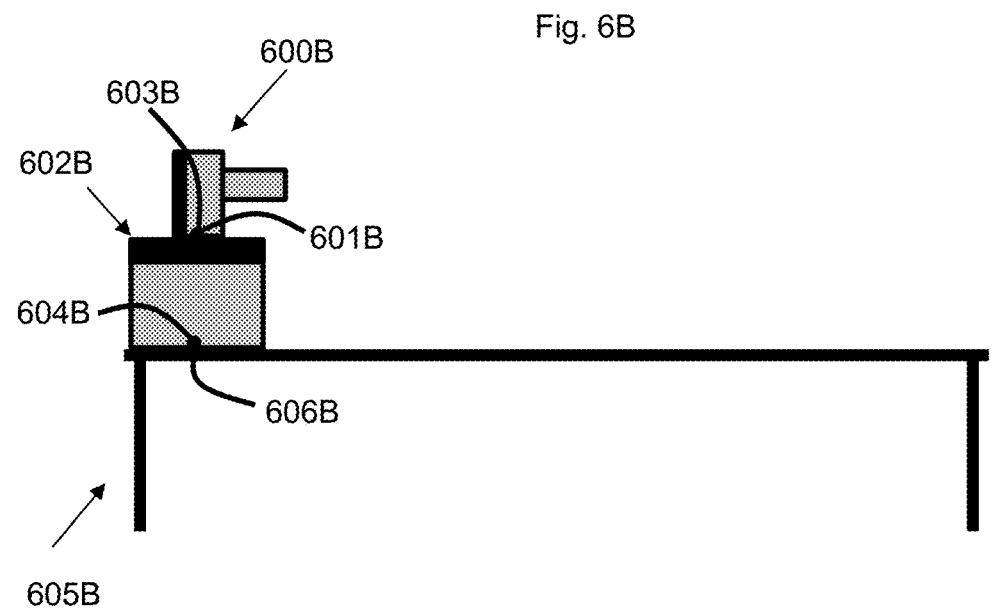

FIG. 6A illustrates three tangible objects with specific points, which can be used for alignment, as shown in FIG. 6B.

FIG. 6B illustrates predetermined spatial relationships with appropriate alignment achieved.

FIG. 7A illustrates a first tangible object and a second tangible object.

FIG. 7B illustrates viewing of the first tangible object and the second tangible object in a head display unit (HDU).

FIG. 8A illustrates a first tangible object and a second tangible object.

FIG. 8B illustrates a first tangible object, a second tangible object and 3D virtual object corresponding to the second tangible object in HDU.

FIG. 9A illustrates a first tangible object and a second tangible object.

FIG. 9B illustrates a first tangible object, a second tangible object and 3D virtual object corresponding to the second tangible object in HDU.

FIG. 10A illustrates a first tangible object and a second tangible object.

FIG. 10B illustrates a first tangible object, a second tangible object and 3D virtual object corresponding to the second tangible object in HDU.

FIG. 11A illustrates a first tangible object and a second tangible object.

FIG. 11B illustrates a first tangible object, a second tangible object, a first 3D virtual object and a second 3D virtual object corresponding in HDU at an early time point.

FIG. 11C illustrates a first tangible object, a second tangible object, a first 3D virtual object and a second 3D virtual object corresponding in HDU at a later time point.

Figure 12A:
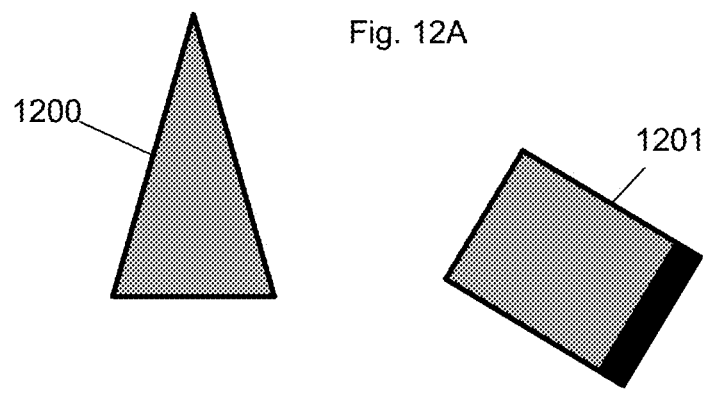

FIG. 12A illustrates a first object and a second object.

Figure 12B:
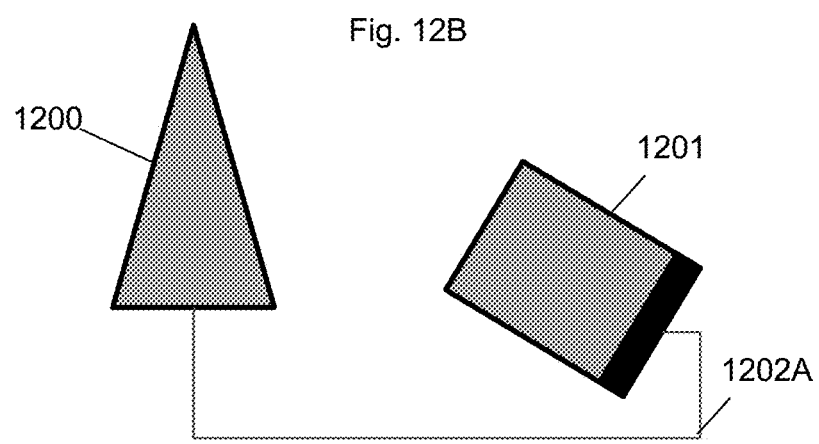

FIG. 12B illustrates what a user would see when looking through the augmented reality HDU, which includes a first object and a second object and a virtual line connecting the two.

Figure 12C:
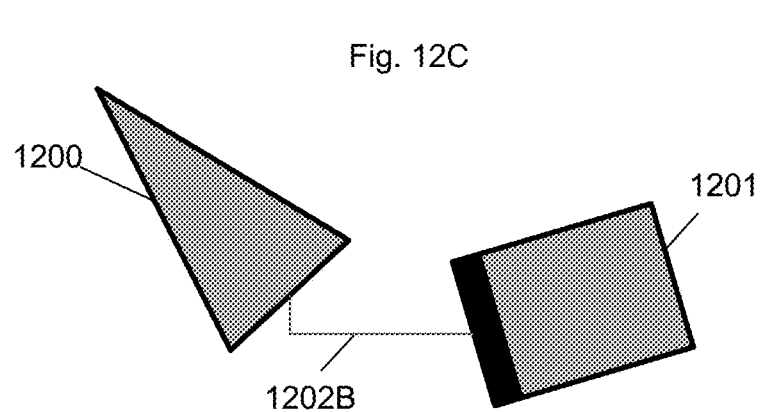

FIG. 12C illustrates what a user would see when looking through the augmented reality HDU, which includes a first object and a second object and a virtual line connecting the two.

FIG. 13 illustrates options for display of virtual objects.

DETAILED DESCRIPTIONS

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 1:
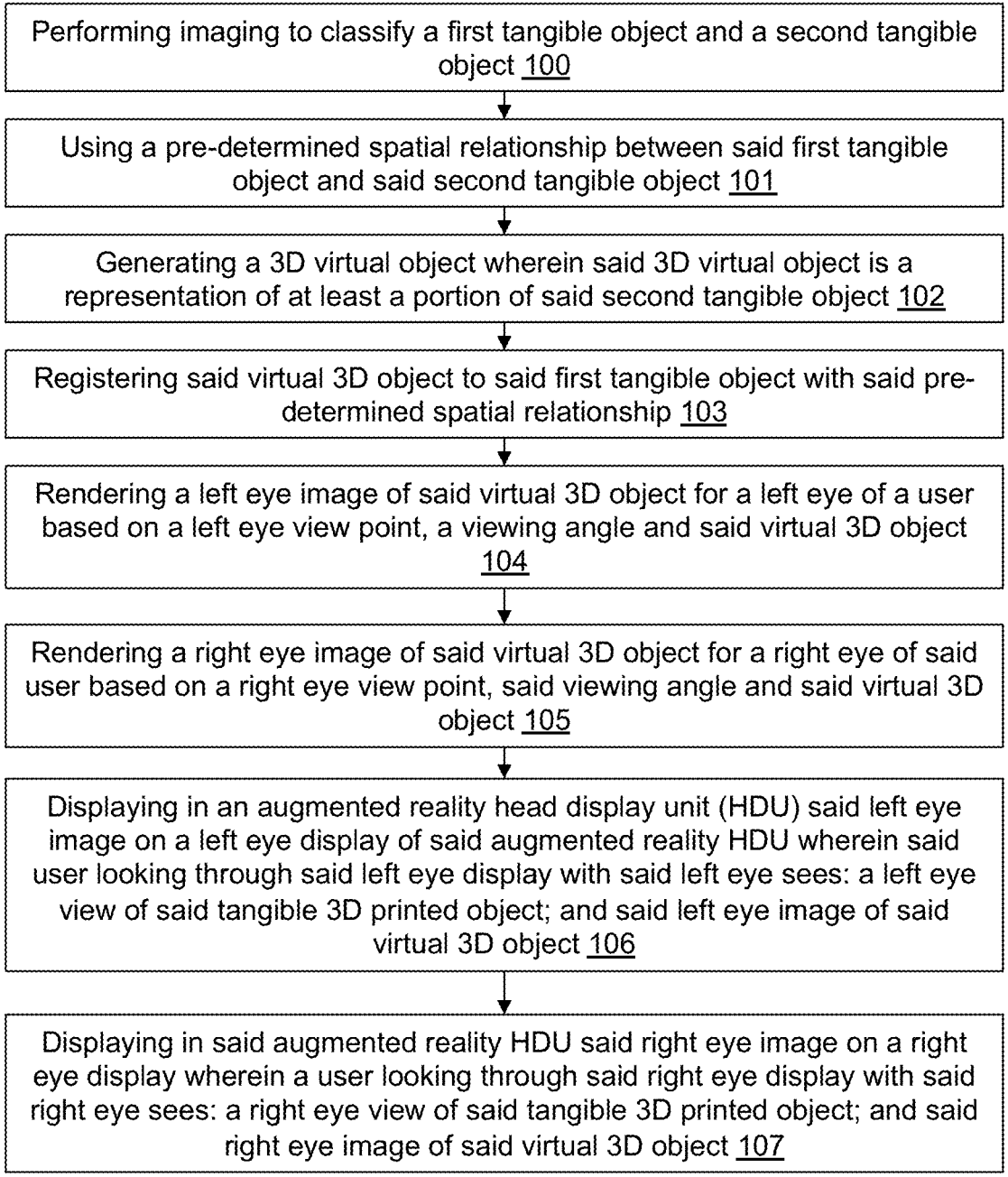
FIG. 1 illustrates

FIG. 1 illustrates optimizing interaction with of tangible tools with tangible objects via registration of virtual objects to tangible tools. 101 illustrates performing imaging to classify a first tangible object and a second tangible object. 102 illustrates using a pre-determined spatial relationship between said first tangible object and said second tangible object. For example, the first tangible object could be a wooden leg of a desk and the second tangible object could be a metal bracket, which should be affixed to the wooden leg. 103 illustrates generating a 3D virtual object wherein said 3D virtual object is a representation of at least a portion of said second tangible object. 104 illustrates registering said virtual 3D object to said first tangible object with said pre-determined spatial relationship. 105 illustrates rendering a left eye image of said virtual 3D object for a left eye of a user based on a left eye view point, a viewing angle and said virtual 3D object. 106 illustrates rendering a right eye image of said virtual 3D object for a right eye of said user based on a right eye view point, said viewing angle and said virtual 3D object. 107 illustrates displaying in an augmented reality head display unit (HDU) said left eye image on a left eye display of said augmented reality HDU wherein said user looking through said left eye display with said left eye sees: a left eye view of said tangible 3D printed object; and said left eye image of said virtual 3D object. 108 illustrates displaying in said augmented reality HDU said right eye image on a right eye display wherein a user looking through said right eye display with said right eye sees: a right eye view of said tangible 3D printed object; and said right eye image of said virtual 3D object.

Figure 2:
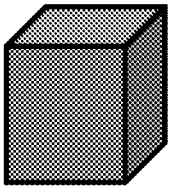
FIG. 2 illustrates an example database comprising tangible objects, 3D virtual objects and respective positioning and orientation.

FIG. 2 illustrates an example database comprising tangible objects, 3D virtual objects and respective positioning and orientation. A top row from a database is show, which illustrates three columns. In the first column denoted "tangible object", a tangible object of a box is illustrated. In the second column denoted "3D virtual object" of a virtual can is noted. In the third column denoted "respective positioning and orientation", the respective positioning of the virtual can and the box is disclosed. Namely, the virtual can should be positioned on top of the box. In some embodiments, the database may comprise several steps, such as a first respective positioning and orientation wherein the virtual can is on top of the box, as illustrated on the top row and subsequently wherein the virtual can is in front of the box, as illustrated on the bottom row.

FIG. 3A illustrates a flow diagram for generating a 3D virtual object. 300 illustrates performing imaging (e.g., use a camera system such as visible spectrum or infrared spectrum or a lidar system). In some embodiments, an array of imaging devices could be used in combination to image an object in the scene (e.g., such as using a visible spectrum camera and a LIDAR system in combination). In the preferred embodiment, this is performed on board a head display unit. 301 illustrates a first option which is analyzing an object in the scene and generating a 3D virtual object to mimic the object (e.g., non-visible portions could be simulated). 302 illustrates a second option which is classifying the object, which can be performed through processes such as using an artificial intelligence (AI) algorithm. 303 illustrates loading a 3D virtual object from a database. 304 illustrates displaying the 3D virtual object from a database.

FIG. 3B illustrates a tangible object. This square shaped object would be imaged by the imaging system as described in 300 above. This tangible object 305 could be seen by a user wearing an augmented reality or mixed reality HDU. The tangible object 300 could be held in a user's hand 306.

FIG. 3C illustrates a 3D virtual object, which matches the tangible object. This square shaped 3D virtual object would be generated in 301, 302 and 303 above. This 3D virtual object 302 would be displayed to a user wearing the augmented reality or mixed reality HDU. The virtual object 302 could be held in a user's hand 303.

FIG. 4A illustrates the 3D virtual object.

FIG. 4B illustrates the 3D virtual object, which has been changed in color to an orange color. Various colors can be used.

FIG. 4C illustrates the 3D virtual object, which has been changed in grayscale to a light gray. Various gray scales can be used.

FIG. 4D illustrates the 3D virtual object, which has been changed in transparency to a highly transparent. Various transparencies can be used.

FIG. 4E illustrates the 3D virtual object, which has been changed in size to larger. Various size changes can be performed.

FIG. 5A illustrates generating a 3D virtual object to complement a tangible object. 500 illustrates performing imaging (e.g., using a camera system or LIDAR system on board the HDU). In this example, assume that the tangible object that is imaged is an engine block without cylinders/pistons. 501 illustrates analyzing an object in the scene and generate 3D virtual object to mimic the object (e.g., non-visible portions could be simulated). For example, a depth sensing camera can be obtained from a single viewpoint, which would allow generation of a 3D model (e.g., polygon mesh, voxelated model) of the visible portions. Note that some portions of the object would not necessarily be visible from a single perspective. Therefore, it is possible that the 3D model is incomplete and the back (non-visible portions) are lacking. In some embodiments, views of the 3D model can be from multiple viewpoints and a full 3D model of the tangible object is achieved. In this example, the generated 3D virtual object would be the engine block without cylinders/pistons. 502 illustrates generating a custom 3D virtual object to complement the 3D virtual object. In this example, the custom 3D virtual objects that are generated are cylinders/pistons. 503 illustrates placing complementary 3D virtual object. This can be performed by a computer process or via a user input (e.g., hand gestures). Note that in some embodiments, the 3D virtual objects can be adjusted in size or shape. 507 illustrates selecting a 3D tangible object, which can correspond to the fitted 3D virtual object. Note that this is discussed further in U.S. patent application Ser. No. 17/093,322, A METHOD OF SELECTING A SPECIFIC SURGICAL DEVICE FOR PREOPERATIVE PLANNING, which is incorporated by reference in its entirety. 504 illustrates classify object (e.g., use AI algorithm to analyze the imaging data from 500 and predict which object the imaging data represents from a list of available objects, such as in a large database. Ideally, there would be feedback to improve the training dataset to improve classification accuracy over time.). 505 illustrates selecting 3D virtual object from a database. In this example, the selected 3D virtual object would be the engine block without cylinders/pistons. 506 illustrates selecting a complementary 3D virtual object from a database. In this example, the selected complementary 3D virtual object would be the cylinders/pistons. The appropriate cylinders/pistons could be ordered in this example. This process improves on the current art because it allows trying out virtual objects together with tangible objects. It also allows re-sizing or re-shaping of the virtual object. This is done prior to selecting a complementary objects. Thus, testing of tangible object—virtual object (s) combinations can be performed. Note that in some embodiments, the complementary 3D virtual object can be delivered for 3D printing.

FIG. 5B illustrates a tangible object, which in this case is the tangible engine block without cylinders/pistons.

FIG. 5C illustrates a virtual object, which in this case is a 3D virtual object representing an engine block without cylinders/pistons.

FIG. 5D illustrates the selected (or generated) complementary virtual object(s), which in this case are 3D virtual objects representing six cylinders/pistons.

FIG. 5E illustrates placing the 3D virtual objects representing six cylinders/pistons into either the tangible engine block or the 3D virtual object representing an engine block without cylinders/pistons.

FIG. 5F illustrates resizing of the 3D virtual objects representing six cylinders/pistons so that they are more appropriately sized with respect to either the tangible engine block or the 3D virtual object representing an engine block without cylinders/pistons.

FIG. 5G illustrates selection or generation of complementary tangible objects. For example, a closest match analysis can be performed from the re-sized/re-shaped virtual objects in FIG. 5F with those available by a manufacturer. Alternatively, re-sized/re-shaped virtual objects in FIG. 5F could be sent to a 3D printer to custom build a complementary 3D part.

FIG. 6A illustrates three tangible objects with specific points, which can be used for alignment, as shown in FIG. 6B. 600A illustrates a first tangible object with point 601A. 602A illustrates a second tangible object with point 603A and point 604A. 605A illustrates a third tangible object with point 606A. A coordinate system is shown. Each tangible object will have an orientation with a roll, pitch and yaw. These will be used in the predetermined spatial relationship. In this example, point 601A of the first tangible object 600A is determined to align with point 603A of the second tangible object 602A. In addition, point 604A in the second tangible object 604A is determined to align with point 606A of the third tangible object 605A.

FIG. 6B illustrates predetermined spatial relationships with appropriate alignment achieved. The first tangible object 600A is aligned with appropriate position and orientation with respect to the second tangible object 602B. Note that point 601B of the first tangible object 600B is now aligned with point 603A of the second tangible object 602A. The second tangible object 602B is aligned with appropriate position and orientation with respect to the third tangible object 605B. Note that point 604A in the second tangible object 604A is aligned with point 606A of the third tangible object 605A.

FIG. 7A illustrates a first tangible object and a second tangible object. 700 illustrates a first tangible object. 701 illustrates a second tangible object.

FIG. 7B illustrates viewing of the first tangible object and the second tangible object in a head display unit (HDU). 702 illustrates an augmented reality HDU. 703A illustrates the left eye display of the HDU 702. 703B illustrates the right eye display of the HDU 702. 700A illustrates the first tangible object, which can be seen when looking through the left eye of the see-through augmented reality display. 700B illustrates the first tangible object, which can be seen when looking through the right eye of the see-through augmented reality display. 701A illustrates the second tangible object, which can be seen when looking through the left eye of the see-through augmented reality display. 701B illustrates the second tangible object, which can be seen when looking through the right eye of the see-through augmented reality display. 704 illustrates a computer. 705 illustrates an imaging system.

FIG. 8A illustrates a first tangible object and a second tangible object. 800 illustrates a first tangible object. 801 illustrates a second tangible object.

FIG. 8B illustrates a first tangible object, a second tangible object and 3D virtual object corresponding to the second tangible object in HDU. 802 illustrates an augmented reality HDU. 803A illustrates the left eye display of the HDU 802. 803B illustrates the right eye display of the HDU 802. 800A illustrates the first tangible object, which can be seen when looking through the left eye of the see-through augmented reality display. 800B illustrates the first tangible object, which can be seen when looking through the right eye of the see-through augmented reality display. 801A illustrates the second tangible object, which can be seen when looking through the left eye of the see-through augmented reality display. 801B illustrates the second tangible object, which can be seen when looking through the right eye of the see-through augmented reality display. 804A illustrates a 3D virtual object displayed in the left eye display of the see-through augmented reality display, which is generated to mimic the the second tangible object, as shown in FIG. 8A. Note that the 3D virtual object is registered to the first tangible object 800. 804B illustrates a 3D virtual object displayed in the right eye display of the see-through augmented reality display, which is generated to mimic the the second tangible object, as shown in FIG. 8A. Note that the 3D virtual object is registered to the first tangible object 800. Please see U.S. Pat. No. 10,712,837, USING GEO-REGISTERED TOOLS TO MANIPULATE THREE-DIMENSIONAL MEDICAL IMAGES, which is incorporated by reference in its entirety. 805A illustrates an annotation for the second tangible object 801A, as displayed in the left eye display 803A of the see-through augmented reality head display unit. An example of the annotation would be the name of the object, which in this example could be "Tangile Block #1". 805B illustrates an annotation for the second tangible object 801A, as displayed in the right eye display 103B of the see-through augmented reality head display unit. 806A illustrates an annotation for the 3D virtual object 804A, as displayed in the left eye display 103A of the see-through augmented reality head display unit. An example of the annotation would be the name of the object, which in this example could be "Virtual Block #1". A goal could be for the user to align "Virtual Block #1" with "Tangible Block #1". Annotations could be text or non-text visual cues. 806B illustrates an annotation for the 3D virtual object 804B, as displayed in the right eye display 803B of the see-through augmented reality head display unit. 807 illustrates a computer. 808 illustrates an imaging system.

FIG. 9A illustrates a first tangible object and a second tangible object. 900 illustrates a first tangible object. 901 illustrates a second tangible object. Note movement as compared to FIG. 8A.

FIG. 9B illustrates a first tangible object, a second tangible object and 3D virtual object corresponding to the second tangible object in HDU. 902 illustrates an augmented reality HDU. 903A illustrates the left eye display of the HDU 902. 903B illustrates the right eye display of the HDU 902. 900A illustrates the first tangible object, which can be seen when looking through the left eye of the see-through augmented reality display. Note movement as compared to FIG. 8A. 900B illustrates the first tangible object, which can be seen when looking through the right eye of the see-through augmented reality display. Note movement as compared to FIG. 8A. 901A illustrates the second tangible object, which can be seen when looking through the left eye of the see-through augmented reality display. 901B illustrates the second tangible object, which can be seen when looking through the right eye of the see-through augmented reality display. 904A illustrates a 3D virtual object displayed in the left eye display of the see-through augmented reality display, which is generated to mimic the second tangible object, as shown in FIG. 9A. Note that the 3D virtual object is registered to the first tangible object 100 so despite the fact that the first tangible object has moved, the 3D virtual object moves along with it in a registered fashion. This is discussed in U.S. Pat. No. 10,712,837, USING GEO-REGISTERED TOOLS TO MANIPULATE THREE-DIMENSIONAL MEDICAL IMAGES, which is incorporated by reference in its entirety. 904B illustrates a 3D virtual object displayed in the right eye display of the see-through augmented reality display, which is generated to mimic the second tangible object, as shown in FIG. 9A. Note that the 3D virtual object is registered to the first tangible object 100 so despite the fact that the first tangible object has moved, the 3D virtual object moves along with it in a registered fashion. 905 illustrates a computer. 906 illustrates an imaging system.

FIG. 10A illustrates a first tangible object and a second tangible object. 1000 illustrates a first tangible object. 1001 illustrates a second tangible object. Note change in orientation as compared to FIG. 8A.

FIG. 10B illustrates a first tangible object, a second tangible object and 3D virtual object corresponding to the second tangible object in HDU. 1002 illustrates an augmented reality HDU. 1003A illustrates the left eye display of the HDU 1002. 1003B illustrates the right eye display of the HDU 1002. 1000A illustrates the first tangible object, which can be seen when looking through the left eye of the see-through augmented reality display. Note change in orientation as compared to FIG. 8A. 1000B illustrates the first tangible object, which can be seen when looking through the right eye of the see-through augmented reality display. Note change in orientation as compared to FIG. 8A. 1001A illustrates the second tangible object, which can be seen when looking through the left eye of the see-through augmented reality display. 1001B illustrates the second tangible object, which can be seen when looking through the right eye of the see-through augmented reality display. 1004A illustrates a 3D virtual object displayed in the left eye display of the see-through augmented reality display, which is generated to mimic the second tangible object, as shown in FIG. 10A. Note that the 3D virtual object is registered to the first tangible object 1000 so despite the fact that the first tangible object has changed in orientation, the 3D virtual object moves along with it in a registered fashion. 1004B illustrates a 3D virtual object displayed in the right eye display of the see-through augmented reality display, which is generated to mimic the second tangible object, as shown in FIG. 10A. Note that the 3D virtual object is registered to the first tangible object 100 so despite the fact that the first tangible object has changed in orientation, the 3D virtual object moves along with it in a registered fashion. 1005 illustrates a computer. 1006 illustrates an imaging system.

FIG. 11A illustrates a first tangible object and a second tangible object. 1100 illustrates a first tangible object. 1101 illustrates a second tangible object. Note change in orientation as compared to FIG. 8A.

FIG. 11B illustrates a first tangible object, a second tangible object, a first 3D virtual object and a second 3D virtual object corresponding in HDU at an early time point. 1102 illustrates an augmented reality HDU. 1002A illustrates a computer. 1002B illustrates an imaging system. 1103A illustrates the left eye display of the HDU 1102. 1103B illustrates the right eye display of the HDU 1102. 1100A illustrates the first tangible object, which can be seen when looking through the left eye of the see-through augmented reality display. Note change in orientation as compared to FIG. 8A. 1100B illustrates the first tangible object, which can be seen when looking through the right eye of the see-through augmented reality display. Note change in orientation as compared to FIG. 8A. 1101A illustrates the second tangible object, which can be seen when looking through the left eye of the see-through augmented reality display. Note change in orientation as compared to FIG. 8A. 1101B illustrates the second tangible object, which can be seen when looking through the right eye of the see-through augmented reality display. Note change in orientation as compared to FIG. 8A. 1104A illustrates a first 3D virtual object displayed in the left eye display of the see-through augmented reality display, which is generated to mimic the first tangible object 1100, as shown in FIG. 11A. Note that the first 3D virtual object 1104A is displayed in close proximity to the first tangible object 1100A as illustrated in the left eye display 1103A. 1104B illustrates a first 3D virtual object displayed in the right eye display of the see-through augmented reality display, which is generated to mimic the first tangible object 1100, as shown in FIG. 11A. Note that the first 3D virtual object 104B is displayed in close proximity to the first tangible object 1100B as illustrated in the right eye display 1103B. 1105A illustrates a second 3D virtual object displayed in the left eye display of the see-through augmented reality display, which is generated to mimic the second tangible object 1101, as shown in FIG. 11A. Note that the second 3D virtual object 1104A is in close proximity to the first tangible object 1100A as illustrated in the left eye display 1103A. 1105B illustrates a second 3D virtual object displayed in the right eye display of the see-through augmented reality display, which is generated to mimic the second tangible object 1101, as shown in FIG. 1A. Note that the second 3D virtual object 104B is in close proximity to the first tangible object 1100B as illustrated in the right eye display 1103B. The generation of virtual objects to correspond to tangible objects can be performed to improve a wide range of tasks. It is envisioned that this will be performed to supplement an instruction manual, for example, for building a desk. For example, the camera system on a HDU can image a pile of parts. A computer system can analyze and classify (e.g., using artificial intelligence algorithms) the various parts. Once the parts are needed for the step at hand, the virtual objects can be generated and displayed on the HDUs. Note that the rendering of the left eye view of the virtual object and the right eye view of the virtual object are described in U.S. Pat. No. 8,384,771, which is incorporated by reference in its entirety. In this example, each virtual object is displayed immediately above the associated tangible object. In some embodiments, a virtual object is displayed in a superimposed fashion over the tangible object. In some embodiments, a virtual object is enlarged and then is displayed in a superimposed fashion over the tangible object. In some embodiments, a virtual object is displayed adjacent to the tangible object.

FIG. 11C illustrates a first tangible object, a second tangible object, a first 3D virtual object and a second 3D virtual object corresponding in HDU at a later time point. 1102 illustrates an augmented reality HDU. 1103A illustrates the left eye display of the HDU 102. 1103B illustrates the right eye display of the HDU 1102. 1100A illustrates the first tangible object, which can be seen when looking through the left eye of the see-through augmented reality display. Note change in orientation as compared to FIG. 8A. 1100B illustrates the first tangible object, which can be seen when looking through the right eye of the see-through augmented reality display. Note change in orientation as compared to FIG. 8A. 1101A illustrates the second tangible object, which can be seen when looking through the left eye of the see-through augmented reality display. Note change in orientation as compared to FIG. 8A. 1101B illustrates the second tangible object, which can be seen when looking through the right eye of the see-through augmented reality display. Note change in orientation as compared to FIG. 8A. 1106A illustrates a first 3D virtual object displayed in the left eye display of the see-through augmented reality display, which is generated to mimic the first tangible object 100, as shown in FIG. 11A. Note that the first 3D virtual object 1106A is displayed in close proximity to the first tangible object 1100A as illustrated in the left eye display 1103A, but it has changed in orientation as compared to FIG. 11B. 1106B illustrates a first 3D virtual object displayed in the right eye display of the see-through augmented reality display, which is generated to mimic the first tangible object 100, as shown in FIG. 11A. Note that the first 3D virtual object 106B is displayed in close proximity to the first tangible object 100B as illustrated in the right eye display 1103B, but it has changed in orientation as compared to FIG.

11B. 1107A illustrates a second 3D virtual object displayed in the left eye display 1103A of the see-through augmented reality display, which is generated to mimic the second tangible object 1101, as shown in FIG. 11A. Note that the second 3D virtual object 1107A has moved towards the first 3D virtual object 1106A as illustrated in the left eye display 1103A. 1107B illustrates a second 3D virtual object displayed in the right eye display 1103B of the see-through augmented reality display, which is generated to mimic the second tangible object 1101, as shown in FIG. 1A. Note that the second 3D virtual object 1107B has moved towards the first 3D virtual object 1106B as illustrated in the right eye display 1103B. Thus, the virtual objects can be moved and rotated to teach the piecing together of the various parts to the user. 1108A illustrates a virtual line as displayed in the left eye display 1103A. 1108B illustrates a virtual line as displayed in the right eye display 1103B.

FIG. 12A illustrates a first object and a second object. 1200 illustrates the first object. 1201 illustrates the second object.

FIG. 12B illustrates what a user would see when looking through the augmented reality HDU, which includes a first object and a second object and a virtual line connecting the two. In the preferred embodiment, a line is used; however, alternative embodiments include other types of visual markers, such as arrows. 1200 illustrates the first object. 1201 illustrates the second object. 1202A illustrates the virtual line. The purpose of the virtual line is to serve as an aid to a user to help teach the user how to appropriately put the pieces together. The virtual line can connect two (or more) tangible objects, two (or more) virtual objects or tangible object to virtual object. This virtual line would be registered to a location on these objects. As the user moves the objects, the virtual line could shorten, lengthen, and move in location. As the user moves the two objects together, the virtual line would shorten. Thus, the user could have the goal of making the virtual line shorten and by doing so, the objects would be appropriately positioned.

FIG. 12C illustrates what a user would see when looking through the augmented reality HDU, which includes a first object and a second object and a virtual line connecting the two. 1200 illustrates the first object, which as moved in position as compared to FIG. 12B. 1201 illustrates the second object, which as moved in position as compared to FIG. 12B. 1202A illustrates the virtual line, which is different in location, position and length as compared to the virtual line in FIG. 12B.

FIG. 13 illustrates options for display of virtual objects. The first design option is the movements of the virtual 3D object. The rate of movement could be fast (e.g., faster than 1 meter per second), medium pace (between 1 cm per second to 1 meter per second) or slow (e.g., slower than 1 cm per second). In some embodiments, the movement could start slow and then accelerate, so as not to scare the user from a suddenly rapidly moving object. Additionally, the directional path of the virtual object could vary. In some embodiments, the path could move at right angles (e.g., straight upward and then straight forward). In some embodiments, the path could move in a smooth arc fashion. Additionally, the control of the movements could be computer controlled (e.g., via AI algorithm to learn what works best for an individual user), user controlled (e.g., via hand gesture) or combination thereof. The second design option is positioning options (with respect to the tangible object which the virtual 3D object mimics). In some embodiments, the positioning of the 3D virtual object could be: above or below; in front or in back; to the left or to the right; or, superimposed. Note positioning options may change over time. The third design option is sizing options (with respect to the tangible object which the virtual 3D object mimics). In some embodiments, the size can be the same, larger or smaller. In some embodiments, the whole 3D virtual object can be adjusted in size. In some embodiments, portions of the 3D virtual object can be adjusted in size. Note sizing options may change over time. The fourth design option is the virtual line options. The virtual line connects two objects together. For example, a virtual line could connect the tip of a Phillips head screw driver to a screw. The virtual line has a variety of appearances, which include, but are not limited to the following: variable color (e.g., red, blue, green); variable thickness (e.g., rope-like thickness, dental-floss like thickness); variable brightness (e.g., bright, dark, etc.); and, variable course through 3D space (e.g., right angles or smooth arcs). Note virtual line options may change over time.

What is claimed is:

1. A method comprising:
performing imaging to classify a first tangible object and a second tangible object;
using a pre-determined spatial relationship between said first tangible object and said second tangible object wherein said pre-determined spatial relationship comprises:
a position of said first tangible object in relation to said second tangible object; and
an orientation of said first tangible object in relation to said second tangible object;
generating a 3D virtual object wherein said 3D virtual object is a representation of at least a portion of said second tangible object;
registering said virtual 3D object to said first tangible object with said pre-determined spatial relationship
wherein said virtual 3D object's position in relation to said first tangible object corresponds to said position of said second tangible object in relation to said first tangible object, and
wherein said virtual 3D object's orientation in relation to said first tangible object corresponds to said orientation of said second tangible object in relation to said first tangible object;
generating a left eye image of said virtual 3D object for a left eye of a user based on a left eye viewpoint, a viewing angle and said virtual 3D object;
generating a right eye image of said virtual 3D object for a right eye of said user based on a right eye viewpoint, said viewing angle and said virtual 3D object;
displaying in an augmented reality head display unit (HDU) said left eye image on a left eye display of said augmented reality HDU wherein said user looking through said left eye display with said left eye sees:
a left eye view of said first tangible object; and
said left eye image of said virtual 3D object; and
displaying in said augmented reality HDU said right eye image on a right eye display of said augmented reality HDU wherein said user looking through said right eye display with said right eye sees:
a right eye view of said first tangible object; and
said right eye image of said virtual 3D object.

2. The method of claim 1 further comprising:
wherein if said first tangible object changes in orientation, said virtual 3D object's position and orientation changes, and
wherein said pre-determined spatial relationship comprises a fixed orientation of said virtual 3D object with respect to said first tangible object.

3. The method of claim 1 further comprising:
wherein if said first tangible object changes in position, only said virtual 3D object's position changes; and
wherein said pre-determined spatial relationship comprises a fixed position of said virtual 3D object with respect to said first tangible object.

4. The method of claim 1 further comprising:
wherein data from said imaging is analyzed by an artificial intelligence algorithm to learn said pre-determined spatial relationship between said first tangible object and said second tangible object; and
wherein said pre-determined spatial relationship is stored in a database.

5. The method of claim 1 further comprising:
wherein said first tangible object is held in said user's hand;
wherein said user's hand controls said first tangible object, and
wherein said position and orientation of said virtual 3D object is stored.

6. The method of claim 1 further comprising performing an alteration of a color of said virtual 3D object based on user input.

7. The method of claim 1 further comprising performing an alteration of a grayscale of said virtual 3D object based on user input.

8. The method of claim 1 further comprising performing an alteration of a transparency of said virtual 3D object based on user input.

9. The method of claim 1 further comprising performing an alteration of a size of said virtual 3D object based on user input.

10. The method of claim 1 further comprising performing a dynamic alteration of an appearance of virtual 3D object based on user input.

11. The method of claim 1 further comprising wherein said augmented reality HDU displays annotations for said virtual 3D object based on user input.

12. The method of claim 1 further comprising wherein said augmented reality HDU displays annotations for said first tangible object based on user input.

13. The method of claim 1 further comprising wherein said first tangible object and said virtual 3D object comprise at least one of the group consisting of:
manufacturing objects;
medical objects;
education objects; and
agricultural objects.

14. The method of claim 1 further comprising wherein said first tangible object and said second tangible object are imaged by at least one of the group of a camera system and a LIDAR system.

15. The method of claim 1 further comprising wherein said first tangible object and said second tangible object are classified by an artificial intelligence algorithm's analysis of data from said imaging.

16. The method of claim 1 further comprising:
generating a digital object for display on said HDU wherein said digital object connects from a location on said second tangible object to a location on said first tangible object; and
displaying a visual notification of said digital object on said HDU. on said HDU.

17. The method of claim 1 further comprising:
generating a digital object for display on said HDU to denote an orientation of said second tangible object; and
displaying a visual notification of said digital object on said HDU.

18. The method of claim 1 further comprising:
generating a second 3D virtual object wherein said second 3D virtual object is a representation of at least a portion of said first tangible object; and
displaying said second 3D virtual object on said HDU with said predetermined spatial relationship.

19. A non-transitory computer storage medium having computer-executable instructions stored thereon which, when executed by a processor, cause the processor to perform the operations of:
performing imaging to classify a first tangible object and a second tangible object;
using a pre-determined spatial relationship between said first tangible object and said second tangible object wherein said pre-determined spatial relationship comprises:
a position of said first tangible object in relation to said second tangible object; and
an orientation of said first tangible object in relation to said second tangible object;
generating a 3D virtual object wherein said 3D virtual object is a representation of at least a portion of said second tangible object;
registering said virtual 3D object to said first tangible object with said pre-determined spatial relationship
wherein said virtual 3D object's position in relation to said first tangible object corresponds to said position of said second tangible object in relation to said first tangible object, and
wherein said virtual 3D object's orientation in relation to said first tangible object corresponds to said orientation of said second tangible object in relation to said first tangible object;
generating a left eye image of said virtual 3D object for a left eye of a user based on a left eye viewpoint, a viewing angle and said virtual 3D object;
generating a right eye image of said virtual 3D object for a right eye of said user based on a right eye viewpoint, said viewing angle and said virtual 3D object;
displaying in an augmented reality head display unit (HDU) said left eye image on a left eye display of said augmented reality HDU wherein said user looking through said left eye display with said left eye sees:
a left eye view of said first tangible object; and
said left eye image of said virtual 3D object; and
displaying in said augmented reality HDU said right eye image on a right eye display of said augmented reality HDU wherein said user looking through said right eye display with said right eye sees:
a right eye view of said first tangible object; and
said right eye image of said virtual 3D object.

20. An augmented reality head display unit (HDU) comprising:
a communications interface, wherein the communications interface is in communication with a non-transitory memory and a processor, the non-transitory memory having computer-executable instructions, which when executed by the processor, perform the operations of:
performing imaging to classify a first tangible object and a second tangible object;
using a pre-determined spatial relationship between said first tangible object and said second tangible object wherein said pre-determined spatial relationship comprises:

a position of said first tangible object in relation to said second tangible object; and an orientation of said first tangible object in relation to said second tangible object;

generating a 3D virtual object wherein said 3D virtual object is a representation of at least a portion of said second tangible object;

registering said virtual 3D object to said first tangible object with said pre-determined spatial relationship wherein said virtual 3D object's position in relation to said first tangible object corresponds to said position of said second tangible object in relation to said first tangible object, and wherein said virtual 3D object's orientation in relation to said first tangible object corresponds to said orientation of said second tangible object in relation to said first tangible object;

generating a left eye image of said virtual 3D object for a left eye of a user based on a left eye viewpoint, a viewing angle and said virtual 3D object;

generating a right eye image of said virtual 3D object for a right eye of said user based on a right eye viewpoint, said viewing angle and said virtual 3D object;

displaying in said augmented reality HDU said left eye image on a left eye display of said augmented reality HDU wherein said user looking through said left eye display with said left eye sees:
a left eye view of said first tangible object; and
said left eye image of said virtual 3D object; and displaying in said augmented reality HDU said right eye image on a right eye display of said augmented reality HDU wherein said user looking through said right eye display with said right eye sees:
a right eye view of said first tangible object; and
said right eye image of said virtual 3D object.

* * * * *